(12) United States Patent
Wegelin et al.

(10) Patent No.: US 10,996,370 B2
(45) Date of Patent: May 4, 2021

(54) SENSING DEVICE

(71) Applicant: GOJO Industries, Inc., Akron, OH (US)

(72) Inventors: Jackson William Wegelin, Stow, OH (US); Chip Curtis, West Dundee, IL (US)

(73) Assignee: GOJO INDUSTRIES, INC., Akron, OH (US)

( * ) Notice: Subject to any disclaimer, the term of this patent is extended or adjusted under 35 U.S.C. 154(b) by 0 days.

(21) Appl. No.: 15/541,087

(22) PCT Filed: Jan. 7, 2016

(86) PCT No.: PCT/US2016/012441
§ 371 (c)(1),
(2) Date: Jun. 30, 2017

(87) PCT Pub. No.: WO2016/112167
PCT Pub. Date: Jul. 14, 2016

(65) Prior Publication Data
US 2018/0017708 A1    Jan. 18, 2018

Related U.S. Application Data

(60) Provisional application No. 62/100,590, filed on Jan. 7, 2015.

(51) Int. Cl.
*G01V 13/00* (2006.01)
*A47K 5/12* (2006.01)
(Continued)

(52) U.S. Cl.
CPC ............ *G01V 13/00* (2013.01); *A47K 5/1217* (2013.01); *G01V 8/20* (2013.01); *E03C 1/057* (2013.01)

(58) Field of Classification Search
CPC .......... E03C 1/057; G01V 13/00; G01V 8/20; A47K 5/1217
See application file for complete search history.

(56) References Cited

U.S. PATENT DOCUMENTS 5,458,147 A * 10/1995 Mauerhofer ............ E03C 1/057
137/1
5,566,702 A * 10/1996 Philipp ................... E03C 1/057
137/1

(Continued)

FOREIGN PATENT DOCUMENTS

WO    2013142224 A1    9/2013

OTHER PUBLICATIONS

International Search Report cited in PCT Application No. PCT/US2016/012441 dated May 4, 2016, pp. 1-14.

*Primary Examiner* — J C Jacyna
(74) *Attorney, Agent, or Firm* — Cooper Legal Group LLC

(57) ABSTRACT

Among other things, a dispensing device is described herein. A sensor component of the dispensing device includes an emitter (e.g., of an emitter array) in optical communication with a detector array for sensing objects disposed between the emitter and the detector array. An object detector is configured to identify a presence of an object between the emitter and the detector array based upon a readout signal generated by the detector array. A calibration component is configured to recalibrate the object detector responsive to determining that an obstruction is present between the emitter and the detector array. The recalibration allows the detector array and the emitter array to detect the presence of an object regardless of the obstruction. A material (e.g., soap, sanitizer, etc.) may be dispensed from the dispensing device responsive to detecting the presence of the object.

20 Claims, 12 Drawing Sheets

(51) Int. Cl.
*G01V 8/20* (2006.01)
*E03C 1/05* (2006.01)

(56) References Cited

U.S. PATENT DOCUMENTS

| | | | | |
|---|---|---|---|---|
| 6,206,340 | B1* | 3/2001 | Paese | E03C 1/057 |
| | | | | 251/129.04 |
| 6,215,116 | B1* | 4/2001 | Van Marcke | E03C 1/057 |
| | | | | 250/214 A |
| 8,096,445 | B2* | 1/2012 | Yang | A47K 5/1217 |
| | | | | 222/52 |
| 2002/0104159 | A1* | 8/2002 | Nishioka | E03C 1/057 |
| | | | | 4/623 |
| 2004/0204791 | A1 | 10/2004 | Hair, III et al. | |
| 2005/0253102 | A1* | 11/2005 | Boilen | E03C 1/05 |
| | | | | 251/129.04 |
| 2011/0010845 | A1* | 1/2011 | Huang | E03C 1/057 |
| | | | | 4/623 |
| 2012/0211086 | A1* | 8/2012 | Huang | E03C 1/057 |
| | | | | 137/2 |
| 2015/0052678 | A1* | 2/2015 | Bayley | A47K 10/48 |
| | | | | 4/638 |

\* cited by examiner

SENSING DEVICE

CROSS-REFERENCE TO RELATED APPLICATIONS

This application claims priority to U.S. Provisional Patent Application No. 62/100,590, filed on Jan. 7, 2015, the entire disclosure of which is hereby incorporated by reference.

TECHNICAL FIELD

The current application pertains to devices for detecting a user and dispensing fluid product from a dispenser to the user. It finds particular application with hygiene dispensers, which may be disposed in locations where contaminates (e.g., dirt, bodily fluid, etc.) may inhibit a detector array from sensing the presence of a user.

BACKGROUND

People entering healthcare facilities, such as hospitals or nursing homes, frequently acquire infections during the course of their stay. Such infections, which patients may not have originally possessed prior to entering the healthcare facility, may be referred to as Healthcare-Associated Infections (HAIs) and represent a serious risk to the health of the patients. HAIs may result in prolonged patient stays and additional treatment, and in other instances even loss of life. In addition to the trauma imposed on the patients and their families, HAIs add significant financial burden to the healthcare facility, which incurs the cost of treatment.

There is significant evidence that good hand hygiene can prevent the spread of HAIs. Washing with soap and clean water and/or the use of hand sanitizers can assist in preventing the transmission of germs. Results from studies have lead health organizations such as the Center For Disease Control (CDC) and the World Health Organization (WHO) to release guidelines for cleaning and sanitizing. Placement and usage of hand sanitizing stations have thus become common throughout the healthcare industry and other industries.

Dispensers, such as hand sanitizing stations, may be located in various types of environments in order to promote sanitization and cleanliness. Dispensers can be used, for example, in schools, factories, restaurants, airports, banks, grocery stores, etc., so that users can use the dispensers to clean and/or sanitize their hands, objects contacting their body (e.g., shopping carts), etc.

Despite the advertised benefits and access to sanitizer, health care workers (HCWs) may not consistently follow published guidelines for suggested hand hygiene. Further, in high soil environments, such as mobile and/or field hospitals, factories, etc., malfunctioning dispensers may hinder a HCW's and/or other user's likelihood and/or ability to utilize sanitizing substances.

SUMMARY

According to an embodiment, a dispensing device for dispensing a material may comprise a sensor component, an object detector, and/or a calibration component. The sensor component may comprise a first emitter in optical communication with a detector array for sensing objects disposed between the first emitter and the detector array. A readout signal may be generated by the detector array based upon the optical communication between the first emitter and the detector array. The object detector may be configured to identify a presence of an object between the first emitter and the detector array when a pulse in the readout signal has an electrical property over an object threshold (e.g., below a voltage threshold or above a voltage threshold). The calibration component may be configured to determine that the electrical property of the pulse (e.g., a detected voltage) is over the object threshold for a defined timespan and thus recalibrate the object detector responsive to the determination. The recalibrating may comprise altering the object threshold based upon the electrical property of the pulse during the defined timespan to generate an updated object threshold (e.g., the voltage threshold may be reduced below the detected voltage so that the object, such as an obstruction, is not detected as a false positive for a user attempting to invoke the dispensing device to dispense a material, such as soap).

According to an embodiment, a method may comprise sensing a first object based upon a change in electromagnetic radiation detected by a detector array. The sensing may comprise generating a pulse in a readout signal output from the detector array based upon the change. The method may comprise determining a timespan during which the first object is detected based upon the readout signal. The first object may be detected when the pulse of the readout signal has an electrical property that exceeds an object threshold. The method may comprise performing a recalibration based upon the timespan exceeding a defined timespan. The recalibration may comprise altering the object threshold, based upon the electrical property of the pulse during the defined timespan, to generate an updated object threshold.

According to an embodiment, a sensing device may comprise a sensor component, an object detector, and/or a calibration component. The sensor component may comprise an emitter array and a detector array in optical communication with the emitter array. The object detector may be configured to identify a presence of an object between the emitter array and the detector array when a pulse of a readout signal, generated by the detector array, has an electrical property over an object threshold. The calibration component may be configured to determine that the object is an obstruction based upon the object being detected for a defined timespan. The calibration component may be configured to perform a recalibration based upon the object being determined to be the obstruction. The recalibration may comprise altering the object threshold based upon the electrical property of the pulse during the defined timespan to generate an updated object threshold.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings.

DETAILED DESCRIPTION

Figure 1:
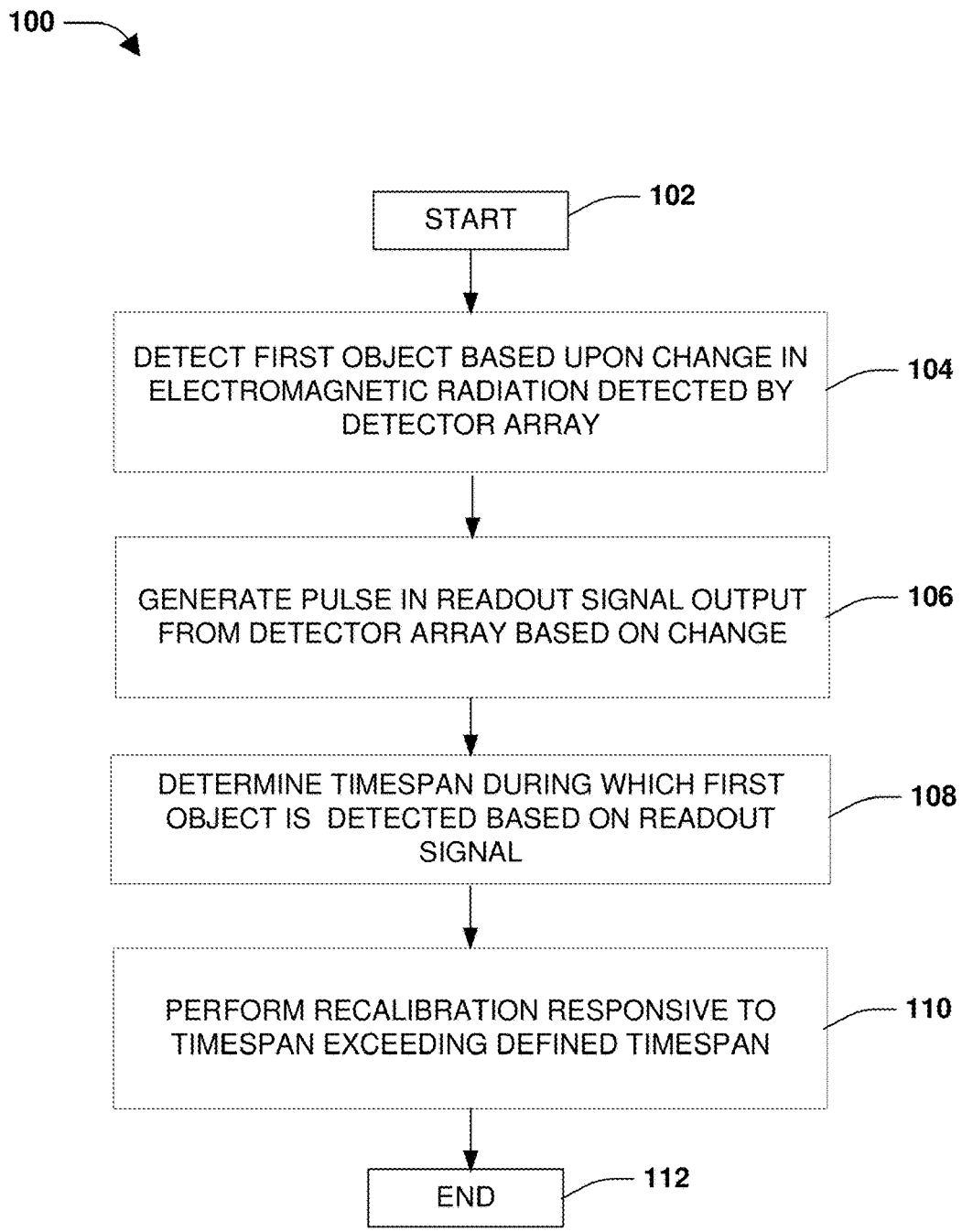
FIG. 1 is an illustration of an example method of object detection and recalibration, according to some embodiments.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

FIG. 1 illustrates a method 100 of object detection and recalibration. At 102, the method 100 starts. A sensor component of a sensing device and/or a dispensing device may be configured to detect objects. For example, a dispenser configured to dispense a material, such as soap or sanitizer, may comprise a sensor configured to detect the presence of a user and to dispense the material responsive to the detection. The sensor component may comprise an emitter array and a detector array, where the emitter array is in optical communication with a detector array. The emitter array may comprise a first emitter, a second emitter, and/or other emitters. The detector array may comprise a first detector, a second detector, and/or other detectors. The emitter array may be configured to emit electromagnetic radiation (e.g., a visible light signal, an ultra violet (UV) signal, and/or an infrared (IR) signal). The sensor component may be in communication with an object detector. The object detector may be configured to identify a presence of an object between the emitter array and the detector array when a pulse in a readout signal, generated by the detector array, has an electrical property (e.g., a voltage) over an object threshold (e.g., a voltage threshold). In an example, absent the detection of the object, the readout signal may remain substantially uniform. In an example, the detection of the object may cause a change in the readout signal for a duration that the object is detected (e.g., an increase or decrease in voltage). A calibration component may be in communication with the sensor component and/or the object detector. The calibration component may recalibrate the object sensor and/or the sensor component.

In an example, the object threshold may be determined during an air calibration. The object threshold may be equivalent to an average readout signal, as generated by the detector array, during the air calibration. The readout signal may be a function of electromagnetic radiation emitted by the emitter array and ambient electromagnetic radiation, as detected by the detector array when no object is present. In an example, the emitter array may emit electromagnetic radiation and the detector array may detect the electromagnetic radiation. The detector array may output the detected electromagnetic radiation according to a voltage (e.g., a voltage measured in millivolts (mV)) in the readout signal. In an example, the object threshold may be between about 0.5 mV to about 5.0 mV or any other voltage. The air calibration may be repeated one or more times before and/or after one or more objects are detected.

At 104, a first object may be detected based upon a change in the electromagnetic radiation detected by the detector array (e.g., a change in the readout signal). By way of example, prior to the first object being present spatially proximate the detector array, the detector array may have detected a first intensity of electromagnetic radiation. When the first object is positioned between the detector array and the emitter array, an interaction of the electromagnetic radiation from the emitter array with the first object may alter the electromagnetic radiation detected by the detector array (e.g., reducing an intensity of electromagnetic radiation detected by the detector array, resulting in either an increase or decrease in voltage of the readout signal output by the detector array). It may be appreciated that while reference is made to varying the voltage of the readout signal based upon a change in the electromagnetic radiation detected by the detector array, other electrical properties of the readout signal may also or instead be varied based upon the change in the electromagnetic radiation. For example, a current of the readout signal may be varied based upon the change in electromagnetic radiation.

At 106, a pulse may be generated in the readout signal, output from the detector array, based on the change in the electromagnetic radiation. The object detector may determine that the first object is present based upon the pulse, within the readout signal, having an electrical property over the object threshold. Otherwise, if the pulse in the readout signal has an electrical property that does not exceed the object threshold, then the first object is not considered present. In an example, the first object may be a part of a user (e.g., a hand, an arm, etc.). Responsive to detecting the first object, the dispenser may dispense a material (e.g., a sanitizing substance).

At 108, a timespan, during which the first object is detected, may be determined based on the readout signal. The calibration component may determine the timespan based upon a time during which the electrical property of the pulse exceeds the object threshold. For example, the calibration component may determine that an electrical property of 2.2 mV exceeds an object threshold of 2.0 mV for a timespan that exceeds a defined timespan, such as between about 10 seconds to about 60 seconds or any other defined timespan.

At 110, a recalibration may be performed responsive to the timespan exceeding the defined timespan. The recalibration may be performed by the calibration component to recalibrate the object detector and/or the sensor component. The recalibration may be performed based upon the first object being determined as an obstruction (e.g., dirt blocking at least some of the electromagnetic radiation) based upon the timespan exceeding the defined timespan. In an example, an indicator, indicating that the sensor component may need to be cleaned, may be activated based upon the detection of the obstruction.

The recalibrating may comprise altering the object threshold to generate an updated object threshold based upon the electrical property of the pulse during the defined timespan. The altering the object threshold may comprise lowering the object threshold, such that a second object (e.g., a user's hand) may be detected notwithstanding the obstruction. In an example, the obstruction may partially block some of the electromagnetic radiation detected by the detector array, such that the updated object threshold may be specified with a value that is lower than the object threshold to allow for object detection. For example, if the object threshold is 2 mV, and the electromagnetic radiation that is detected by the detector array, in the presence of the second object and the obstruction, results in a pulse in the readout signal having an electrical property of 1.2 mV, then the second object is not detected, because the pulse is below the object threshold. In an example, the emitter array may emit electromagnetic radiation with an increased signal intensity so that the detector array may detect the second object in the presence of the obstruction. In an example, where the emitter array emits electromagnetic radiation with the increased signal intensity, the updated object threshold may be higher than the object threshold.

The generating the updated object threshold may comprise performing a second air calibration in the presence of the obstruction. The updated object threshold may be a function of electromagnetic radiation emitted by the emitter array and ambient electromagnetic radiation, as detected by the detector array, when the obstruction is present. The detector array may output an updated readout signal, where the updated readout signal may be a function of the electromagnetic radiation detected by the detector array in the presence of the obstruction. In an example, the updated object threshold may be between about 0.2 mV and about 4.5 mV or any other voltage.

The second object may be detected based upon a change in the electromagnetic radiation detected by the detector array. In an example, when the second object is positioned between the detector array and the emitter array, the interaction of the electromagnetic radiation from the emitter array with the second object may alter the electromagnetic radiation detected by the detector array. A second pulse may be generated in the readout signal output from the detector array based on the change in the electromagnetic radiation. The object detector may determine that the second object is present based upon the second pulse, within the readout signal, having a second electrical property over the updated object threshold. The electrical property of the pulse may be between about 0.2 mV and about 5.8 mV or any other voltage. In an example, the second object may be a part of the user. Responsive to detecting the second object, the dispenser may dispense the material. In an example, where one or more additional objects are detected for the timespan over the defined timespan, one or more recalibrations may be performed. At 112, the method 100 ends.

FIGS. 2A-2E illustrate a dispensing device 202 comprising a sensor component 220. The dispensing device 202 may comprise a detector array 206 in optical communication with an emitter array 204. The detector array 206 may comprise a first detector, a second detector, and/or other detectors. The emitter array 204 may comprise a first emitter, a second emitter, and/or other emitters. The emitter array 204 may emit electromagnetic radiation 224 through a first lens 209, and the detector array 206 may detect electromagnetic radiation 224 through a second lens 208. At least one of the emitters may be separated from one or more other emitters by a shroud (not shown) to inhibit refraction and/or reflection of the electromagnetic radiation 224. The first lens 209 may be adjacent to the emitter array 204. The second lens 208 may be adjacent the detector array 206. In an example, the emitter array 204 may be positioned above a dispensing area (e.g., an area into which the dispensing device 202 dispenses material 230) and the detector array 206 may be positioned under the dispensing area. In an example, the detector array 206 may be positioned above the dispensing area and the emitter array 204 may be positioned under the dispensing area. The detector array 206 and the emitter array 204 may or may not be coplanar. The detector array 206 and the emitter array 204 may have any orientation relative to one another. The detector array 206 may be spaced an array distance (e.g., about 1.5 inches) from the emitter array 204 (e.g., as measured from a central point of the detector array 206 facing the emitter array 204 to a central point on the emitter array 204 facing the detector array 206). In some embodiments, the array distance is between about 0.25 inches to about 6 inches.

At least one of the first lens 209 or the second lens 208 may comprise glass, polycarbonate, a plastic material, etc. The first lens 209 may be configured to focus the electromagnetic radiation 224 toward the detector array 206 based upon various factors. For example, depending upon a thickness, size, shape, location, etc., of the first lens 209, the first lens 209 may disperse more or less electromagnetic radiation 224 (e.g., and thus adjust a focal spot of the electromagnetic radiation 224). The first lens 209 may, for example, have a thickness, as measured in a direction from the emitter array 204 to the dispensing area, between about 0.10 inches to about 0.20 inches. The thickness of the first lens 209 may also increase the structural integrity of the first lens 209 (e.g., for industrial environments). The first lens 209 may be concave and may be spaced a first distance (e.g., between about 1 inch to about 2 inches) from the emitter array 204 (e.g., as measured from a central point of the emitter array 204 to a central point on an inner surface of the first lens 209, where the inner surface faces the emitter array 204). Depending upon a degree of concavity of the first lens 209, the first distance may be between about 0.25 inches to about 2 inches, where more or less electromagnetic radiation 224 is dispersed based upon the first distance.

It may be appreciated that a distance less than some minimum distance, such as 0.25 inches, may position the first lens 209 too close to the emitter array 204 to enable the electromagnetic radiation 224 to disperse around objects such as a contaminant (e.g., dirt). For example, if the first lens 209 was in contact with the emitter array 204, then a small amount of the contaminant may reflect or absorb a majority of the electromagnetic radiation 224. By spacing the first lens 209 away from the emitter array 204, the electromagnetic radiation 224 may be dispersed before contacting the first lens 209 and thus a small amount of the contaminant will reflect less of the electromagnetic radiation 224. While specific reference is made to a concave lens, the first lens 209 may have any shape(s) such as convex, concave, flat, round, oblong, square, rectangular, etc. The first lens 209 may be any size. In an example, the first lens 209 is between about 3 inches to about 8 inches wide as measured left to right on the page in FIGS. 2A-2E. In an example, the first lens 209 is between about 3 inches to about 8 inches long as measured into and out of the page in FIGS. 2A-2E. The first lens 209 may be configured to inhibit contaminants, such as soils, etc., from contacting the emitter array 204. In an example, more contaminants may be required to cover or occlude the first lens 209 when the first lens 209 has a larger size as compared to when the first lens 209 has a smaller size. Given a fixed quantity or area of contaminant, a larger lens may thus allow more electromagnetic radiation 224 to pass as compared to a smaller lens.

The second lens 208 may be configured to focus the electromagnetic radiation 224 toward the detector array 206 based upon various factors. For example, depending upon a thickness, size, shape, location, etc., of the second lens 208, the second lens 208 may focus more or less electromagnetic radiation 224 (e.g., and thus adjust a focal spot of the electromagnetic radiation 224). The second lens 208 may, for example, have a thickness, as measured in a direction from the detector array 206 to the dispensing area, between about 0.10 inches to about 0.20 inches. The thickness of the second lens 208 may also increase the structural integrity of the second lens 208 (e.g., for industrial environments). The second lens 208 may be concave and may be spaced a second distance (e.g., between about 1 inch to about 2 inches) from the detector array 206 (e.g., as measured from a central point of the detector array 206 to a central point on an inner surface of the second lens 208, where the inner surface faces the detector array 206). Depending upon a degree of concavity of the second lens 208, the second distance may be between about 0.25 inches to about 2 inches, where more or less electromagnetic radiation 224 is focused based upon the second distance.

It may be appreciated that a distance less than some minimum distance, such as 0.25 inches, may position the second lens 208 too close to the detector array 206 to enable the detector array 206 to "see around" a contaminate on the second lens 208. While specific reference is made to a concave lens, the second lens 208 may have any shape(s) such as convex, concave, flat, round, oblong, square, rectangular, etc. The second lens 208 may be any size. In an example, the second lens 208 is between about 3 inches to about 8 inches wide as measured top to bottom on the page in FIGS. 2A-2E. In an example, the second lens 208 is between about 3 inches to about 8 inches long as measured into and out of the page in FIGS. 2A-2E. The second lens 208 may be configured to inhibit contaminants, such as soils, etc., from contacting the detector array 206. In an example, more contaminants may be required to cover or occlude the second lens 208 when the second lens 208 has a larger size as compared to when the second lens 208 has a smaller size. Given a fixed quantity or area of contaminant, a larger lens may thus allow more electromagnetic radiation 224 to pass as compared to a smaller lens.

An indicator 226 may comprise a mechanism to indicate that the first lens 209 and/or the second lens 208 is soiled (e.g., is obstructed in some way). The indicator 226 may comprise a light source and/or a speaker. The indicator 226 may indicate the first lens 209 and/or the second lens 208 is soiled by emitting a sound and/or emitting a light.

A communication circuit 222 may be in communication with the emitter array 204 and the detector array 206. The communication circuit 222 may control a timing of the emission of the electromagnetic radiation 224 from the emitter array 204, and may correlate the time of the emission with a detection of the electromagnetic radiation 224 by the detector array 206. The communication circuit 222 may comprise a programmable circuit. An object detector 214 may be in communication with the detector array 206. The object detector 214 may be configured to identify a presence of an object between the emitter array 204 and the detector array 206 when a pulse in a readout signal, generated by the detector array 206, has an electrical property over an object threshold.

A calibration component 216 may be in communication with the object detector 214 and/or the sensor component 220. The calibration component 216 may recalibrate the object detector 214 and/or the sensor component 220. The calibration component 216 may determine a timespan during which the object is detected by determining a time during which the electrical property of the pulse is over the object threshold. A dispenser component 218 may be in communication with the object detector 214. The dispenser component 218 may dispense a material 230 (e.g., a sanitizing substance), illustrated in FIG. 2B, responsive to the object detector 214 identifying the presence of the object.

Figure 2A:
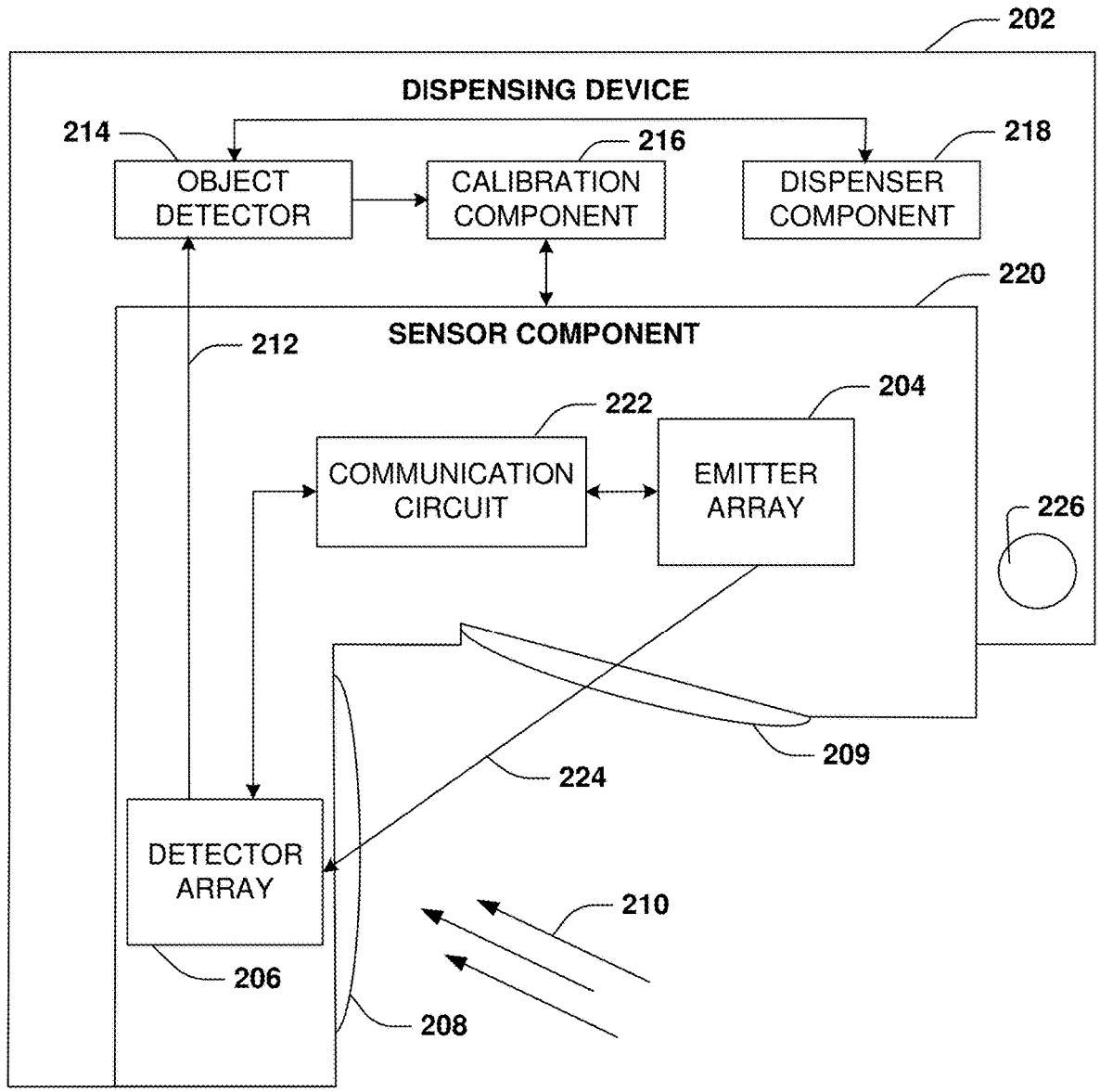
FIG. 2A is an illustration of an example dispensing device performing an air calibration, according to some embodiments.

FIG. 2A illustrates the dispensing device 202 performing an air calibration. The air calibration may be used to determine the object threshold. Because no object is present, the readout signal may be a function of the electromagnetic radiation 224 emitted by the emitter array 204 and ambient electromagnetic radiation 210, as detected by the detector array 206. The detector array 206 may output the readout signal 212 to the object detector 214. In an example, the emitter array 204 may emit the electromagnetic radiation 224 (e.g., an infrared (IR) signal, an ultra violet (UV) signal, and/or a visible light signal) and the detector array 208 may detect the electromagnetic radiation 224. The readout signal 212 may be expressed as a voltage, such as in millivolts (mV), and in some embodiments, the object threshold is set based upon an average voltage of the readout signal during the air calibration. In an example, the object threshold may be between about 0.5 mV and about 5.0 mV or any other voltage. The air calibration may be repeated one or more times before and/or after one or more objects are detected.

Figure 2B:
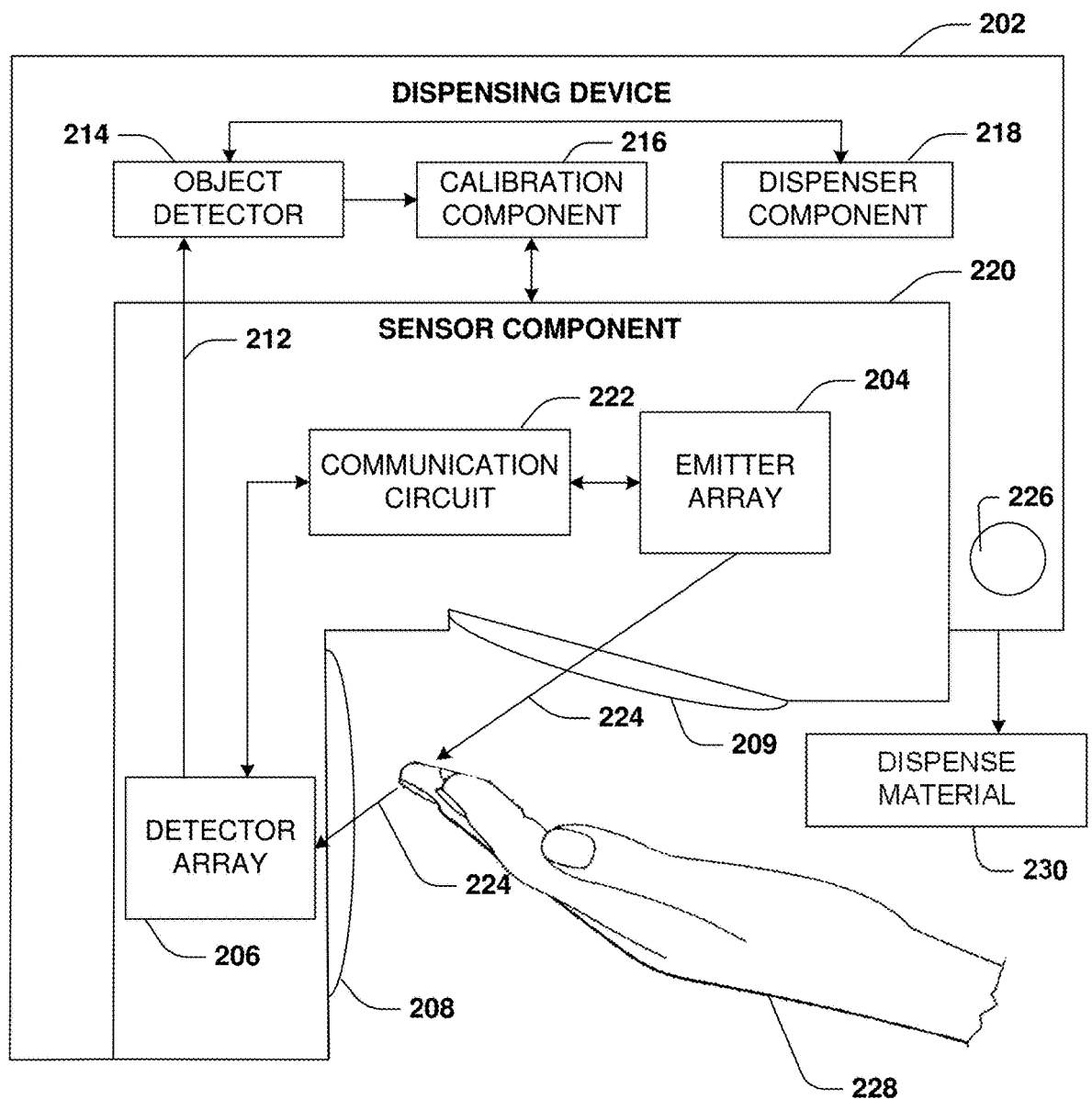
FIG. 2B is an illustration of an example dispensing device dispensing a material, according to some embodiments.

FIG. 2B illustrates the dispensing device 202 detecting a first object 228. The first object 228 (e.g., a hand, a wrist, or other body part of a user) may be detected based upon a change in the electromagnetic radiation 224 detected by the detector array 206 responsive to interaction of the electromagnetic radiation 224 with the first object 228. In an example, when the first object 228 is positioned between the detector array 206 and the emitter array 204, the interaction of the electromagnetic radiation 224 from the emitter array 204 with the first object 228 may alter the electromagnetic radiation 224 detected by the detector array 206. The change may be relative to the electromagnetic radiation 224 detected by the detector array 206 during the air calibration (e.g., a baseline value). A pulse may be generated in the readout signal 212 from the detector array 206 based on the change in the electromagnetic radiation 224. The object detector 214 may determine that the first object 228 is present based upon the pulse, in the readout signal 212, having an electrical property exceeding the object threshold. For example, where the object threshold corresponds to a voltage threshold, the object detector 214 may determine that the first object 228 is present when the voltage of the pulse exceeds the voltage threshold. Responsive to detecting the first object 228, the dispenser component 218 may dispense the material 230.

Figure 2C:
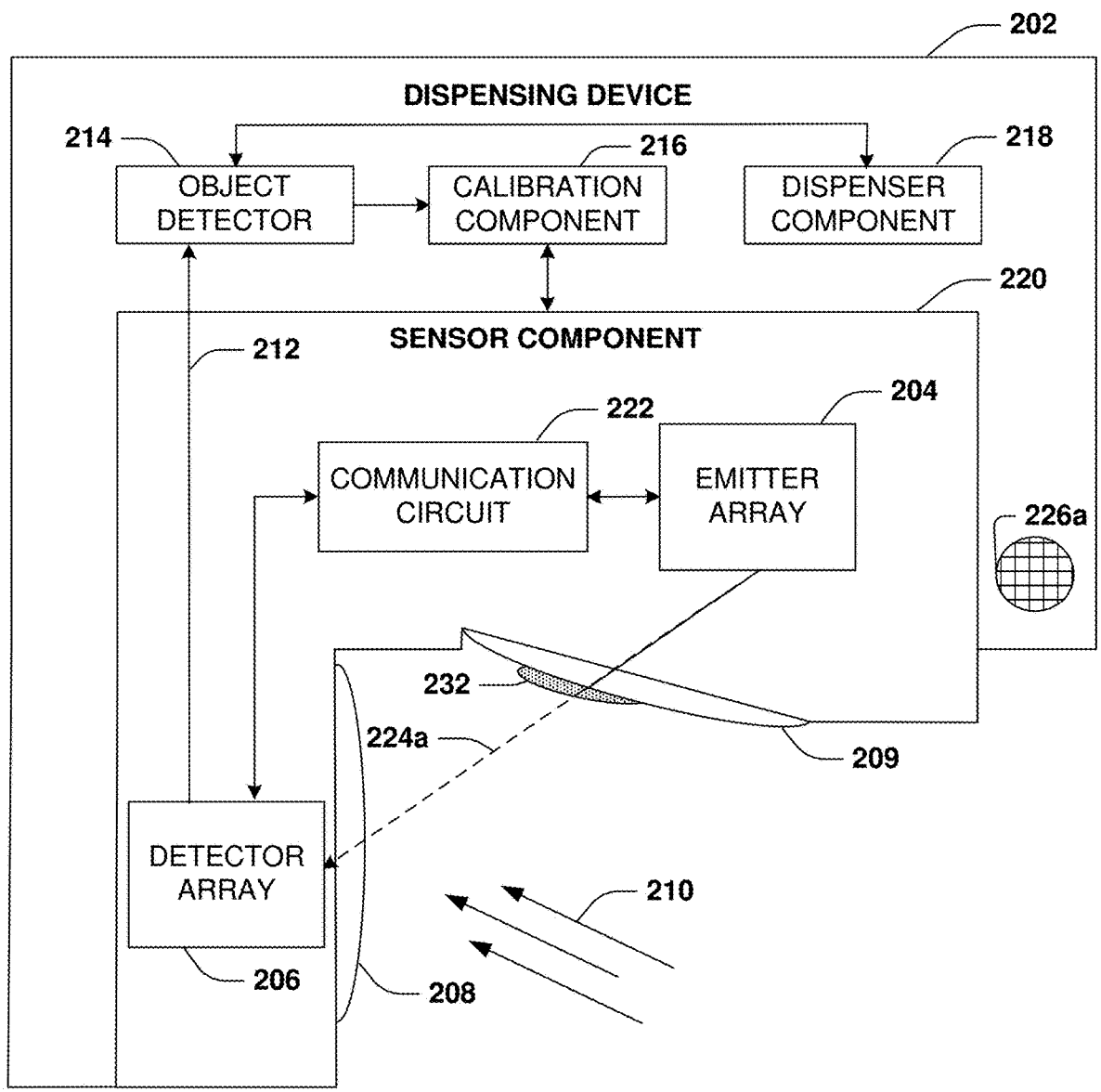
FIG. 2C is an illustration of an example dispensing device detecting an obstruction, according to some embodiments.

FIG. 2C illustrates the dispensing device 202 detecting an obstruction 232. The obstruction 232 (e.g., dirt, oil, etc.) may be on the first lens 209 and/or the second lens 208. The obstruction 232 may be initially (e.g., without recalibration) detected as a second object and responded to in the same manner as the first object 228 as described with regards to FIG. 2B (e.g., the material may be dispensed based upon the detection of the second object). In an example, when the obstruction 232 is positioned between the detector array 206 and the emitter array 204, the interaction of the electromagnetic radiation 224 from the emitter array 204 with the obstruction 232 may alter the electromagnetic radiation 224 to an altered electromagnetic radiation 224a detected by the detector array 206. The interaction with the obstruction 232 may alter the intensity of the altered electromagnetic radiation 224a, such that the detector array 206 would not detect an object between the emitter array 204 and the detector array 206. Because the obstruction 232 alters the intensity of the altered electromagnetic radiation 224a, a second electrical property of a second pulse in the readout signal 212, generated in response to the object, may be below the object threshold, and thus the object may not be detected. Although the obstruction 232 is illustrated as altering the electromagnetic radiation 224 as it is emitted by the emitter array 204, the obstruction may also alter the electromagnetic radiation 224 as it is returning to the detector array 206.

A timespan, during which the second object is detected, may be determined based on the duration of the second pulse in the readout signal 212. The calibration component 216 may determine the timespan based upon a time during which the electrical property of the second pulse is over the object threshold. For example, where the object threshold is 1.8 mV and the electrical property of the pulse is 2.0 mV, if the electrical property of the pulse remains over the object threshold for about 5 seconds then the timespan may be 5 seconds. If the timespan, within which the second object is detected, exceeds a defined timespan, then the second object may be defined as the obstruction 232.

A recalibration may be performed by the calibration component 216 responsive to the timespan exceeding the defined timespan. The recalibrating may comprise communicating with the object detector 214 and/or the sensor component 220 to alter the object threshold to generate an updated object threshold. The updated object threshold may be determined using a second air calibration (e.g., similar to the air calibration described in FIG. 1). In an example, the updated object threshold may be between about 0.2 mV and about 4.5 mV or any other voltage. If an obstruction is determined to be present, then the indicator 226 may be activated 226a (e.g., emit a light or a sound).

In an example, the object threshold may be altered by lowering the object threshold, such that the object may be detected even though the obstruction 232 is being detected by the sensor component 220. In an example, the obstruction 232 may partially block some of the electromagnetic radiation 224 emitted from the emitter array 204 and/or some of the electromagnetic radiation 224 that would otherwise be detected by the detector array 206 by absorbing, reflecting, and/or refracting the electromagnetic radiation 224. Because less of the electromagnetic radiation 224 may be detected by the detector array 206, the updated object threshold may need to be lower than the object threshold to allow for object detection. In an example, the emitter array 204 may emit electromagnetic radiation having an increased signal intensity such that the detector array 206 may detect the object in the presence of the obstruction 232 (e.g., where the intensity is increased enough to penetrate the obstruction 232 with an amount of electromagnetic radiation that is detectable using the object threshold). In an example, where the emitter array 204 emits electromagnetic radiation with the increased signal intensity, the updated object threshold may be higher and/or the same as the object threshold.

Figure 2D:
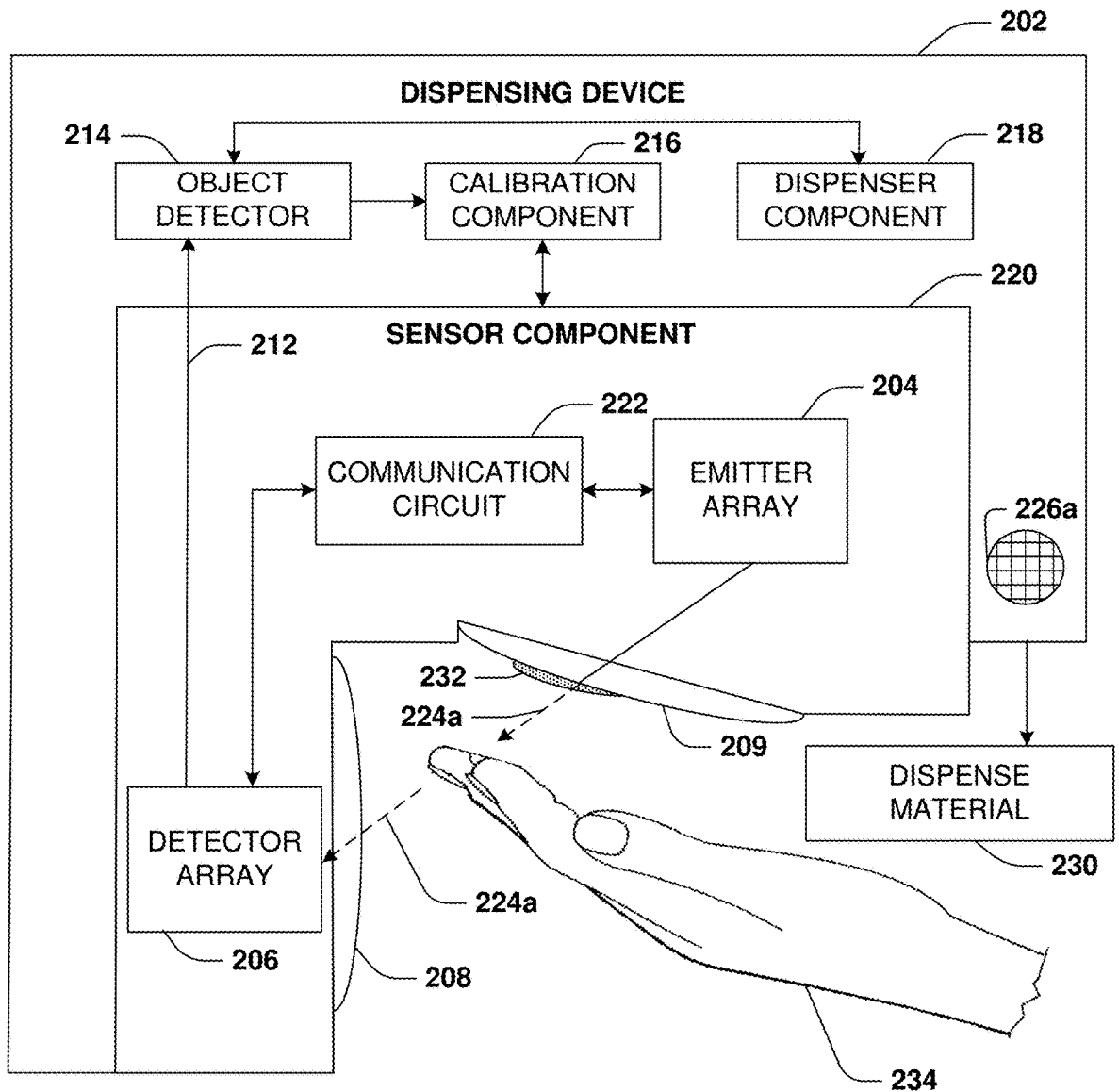
FIG. 2D is an illustration of an example dispensing device dispensing a material in the presence of an obstruction, according to some embodiments.

FIG. 2D illustrates the dispensing device 202 detecting a third object 234 in the presence of the obstruction 232. The dispensing device 202 may detect the third object 234 based upon the updated object threshold. The third object 234 (e.g., a hand, a wrist, or other body part of the user) may be detected based upon the change in the altered electromagnetic radiation 224a detected by the detector array 206 responsive to the altered electromagnetic radiation 224a interacting with the third object 234. The change may be compared to the altered electromagnetic radiation 224a detected by the detector array 206 during the second air calibration. A third pulse may be generated in the readout signal 212 from the detector array 206 based on the change in the altered electromagnetic radiation 224a. The object detector 214 may determine that the third object 234 is present based upon the third pulse, in the readout signal 212, having an electrical property over the updated object threshold (e.g., an updated voltage threshold). Responsive to detecting the third object 234, the dispenser component 218 may dispense the material 230. In an example, the updated object threshold may be altered based upon one or more additional obstructions.

Figure 2E:
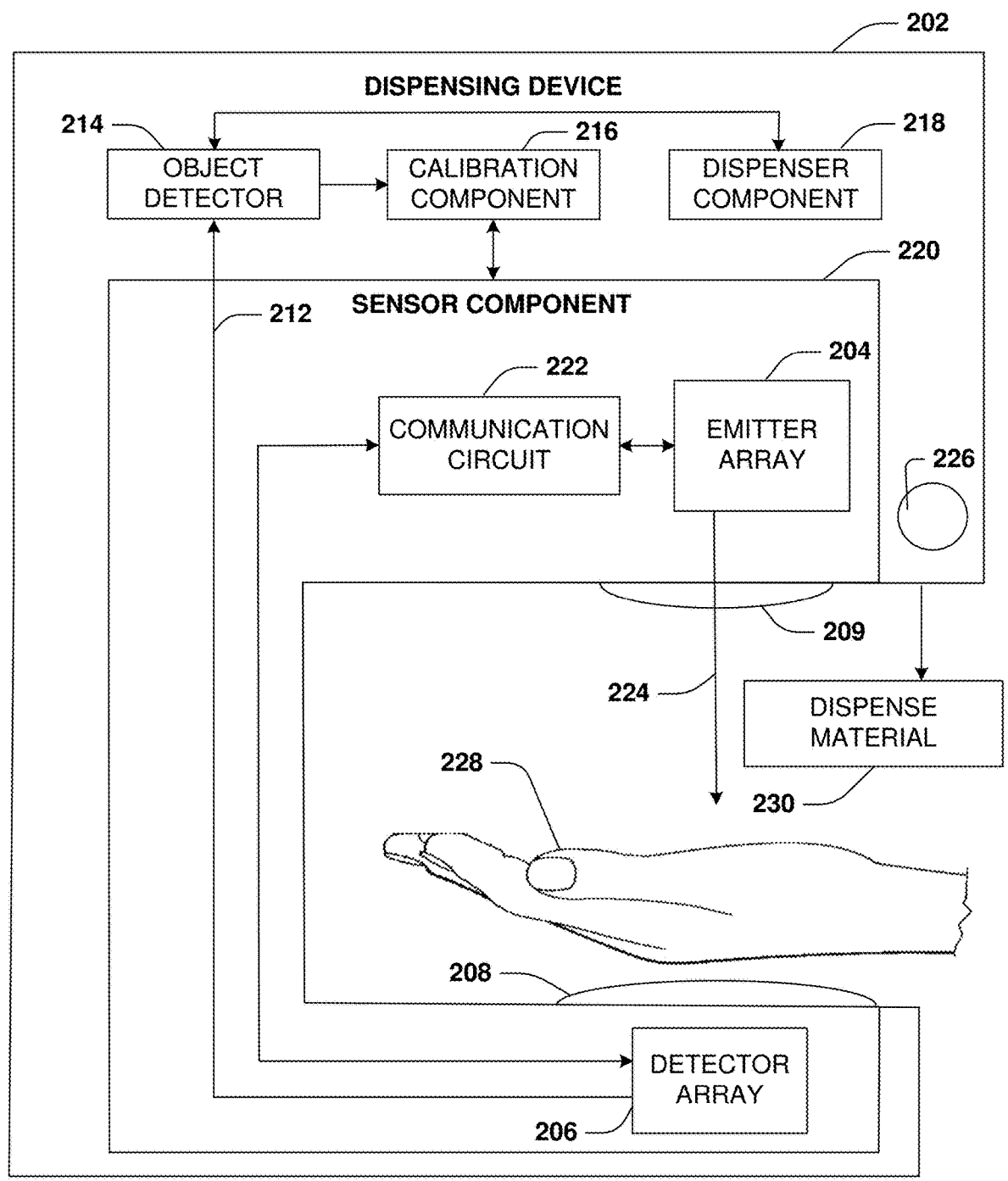
FIG. 2E is an illustration of an example dispensing device dispensing a material, according to some embodiments.

FIG. 2E illustrates an alternate configuration of the dispensing device 202. In this configuration, the emitter array 204 is disposed diametrically opposite the detector array 206 relative to a region in which the object 228 is detected. It may be appreciated, however, that any suitable configuration of the emitter array 204 (e.g., and the first lens 209) relative to the detector array 206 (e.g., and the second lens 208) is contemplated herein. It may also be appreciated that while FIGS. 2A-2E illustrate a broken beam type sensor component, where the electromagnetic radiation emitted from the emitter array 204 follows a substantially linear path to the detector array 206, in other embodiments, the sensor component 220 may be configured as a reflective type sensor. In a reflective type sensor, the electromagnetic radiation emitted from the emitter array 204 follows a substantially non-linear path to the detector array 206. For example, the emitter array 204 and the detector array 206 may be disposed on a same side of the region in which the object 228 is detected, and a reflective material may be disposed on the diametrically opposite side of the region relative to the emitter array 204 and the detector array 206. In such embodiments, the reflective material reflects the electromagnetic radiation 224 emitted from the emitter array 204 toward the detector array 206, for example.

Figure 3A:
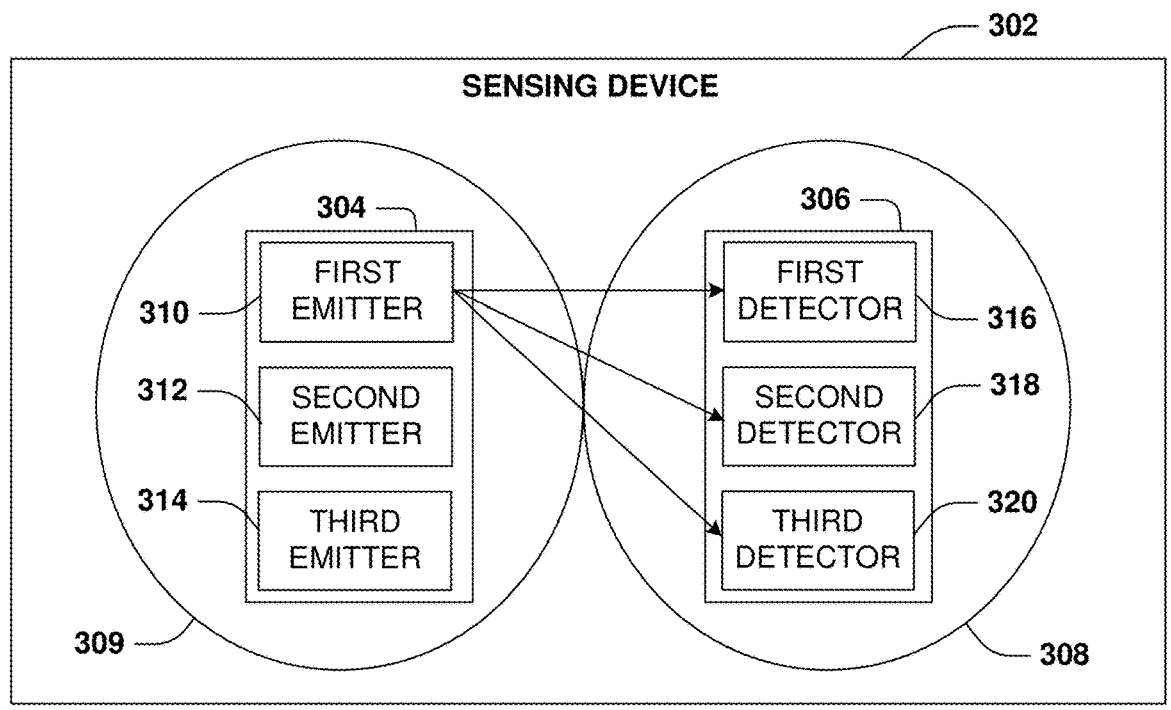
FIG. 3A is an illustration of an example sensing device, according to some embodiments.
Figure 3B:
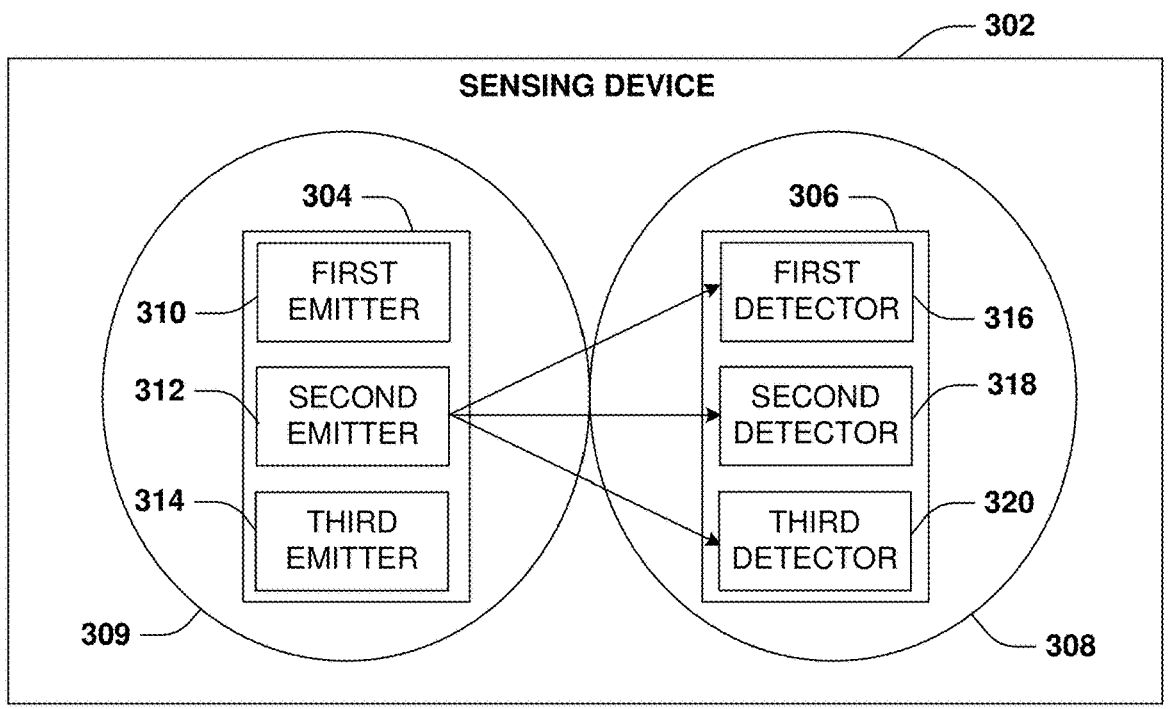
FIG. 3B is an illustration of an example sensing device, according to some embodiments.
Figure 3C:
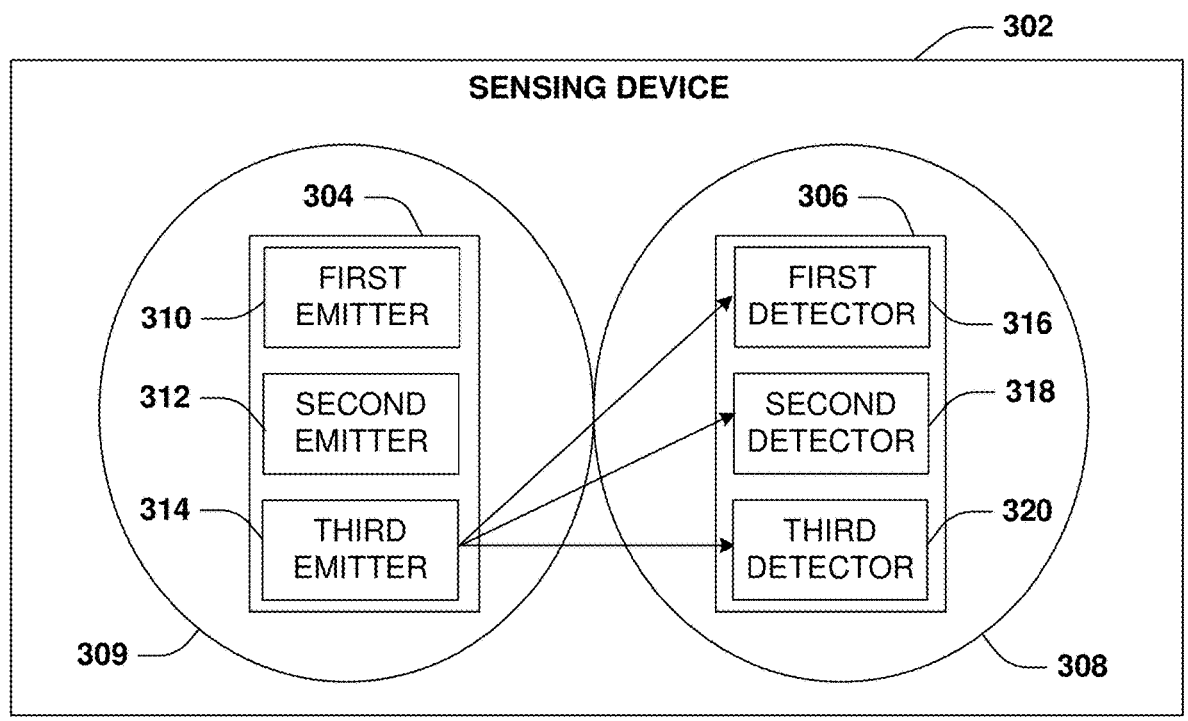
FIG. 3C is an illustration of an example sensing device, according to some embodiments.

FIGS. 3A-3C illustrate a sensing device 302 (e.g., comprising emitter array 204, detector array 206, etc. of FIGS. 2A-2E). The sensing device 302 may comprise an emitter array 304 (e.g., emitter array 204 of FIGS. 2A-2E) in optical communication with a detector array 306 (e.g., detector array 206 of FIGS. 2A-2E). The emitter array 304 may comprise a first emitter 310, a second emitter 312 and a third emitter 314 (e.g., and/or more or fewer emitters). The detector array 306 may comprise a first detector 316, a second detector 318, and a third detector 320 (e.g., and/or more or fewer detectors). It may be appreciated that emitters of the emitter array 304 may be spaced apart any suitable distance(s) from one another and/or that detectors of the detector array 306 may be spaced apart any suitable distance(s) from one another. A first lens 309 may be disposed over the emitter array 304 and a second lens 308 may be disposed over the detector array 306. A communication circuit (not shown) may control a sequence of the emitter array 304 (e.g., control when the first emitter 310, the second emitter 312, and the third emitter 314 emit electromagnetic radiation). The electromagnetic radiation may comprise a visible light signal, an ultra violet (UV) signal, and/or an infrared (IR) signal. The communication circuit may indicate that the emitters (e.g., the first emitter 310, the second emitter 312, and the third emitter 314) of the emitter array 304 should emit light sequentially. The communication circuit may instruct which emitters are to emit and which detectors are to detect (e.g., a specific ordering and/or specific emission/detection times). For example, the first emitter 310 may emit electromagnetic radiation during a first interval of time, the second emitter 312 may emit electromagnetic radiation during a second interval of time, and the third emitter 314 may emit electromagnetic radiation during a third interval of time. In an example, the second interval of time may not overlap the first interval of time and/or the third interval of time and the third interval of time may not overlap the first interval of time. In an example, the first emitter 310, the second emitter 312, and/or the third emitter 314 may be configured to emit electromagnetic radiation at similar or different frequencies, intensity, and/or wavelengths.

The sensing device 302 may be in communication with an object detector (not shown). The object detector may be configured to identify a presence of objects between the emitter array 304 and the detector array 306 when a pulse in a readout signal, generated by the detector array 306, has an electrical property (e.g., a voltage) within an object threshold. A calibration component (not shown) may be in communication with the sensor component and/or the object detector. The calibration component may recalibrate the object detector responsive to the object detector detecting an obstruction between the emitter array 304 and the detector array 306.

FIG. 3A illustrates the first emitter 310 interacting with the detector array 306. The first emitter 310 may be emitting electromagnetic radiation. The electromagnetic radiation may be detected by the first detector 316, the second detector 318, and/or the third detector 320. The first emitter 310 and the first detector 316 may comprise a first sensor pair, the first emitter 310 and the second detector 318 may comprise a second sensor pair, and the first emitter 310 and the third detector 320 may comprise a third sensor pair. Because the communication circuit monitors and/or controls which emitter 310, 312, 314 of the emitter array 304 emits electromagnetic radiation, an obstruction location may be identified (e.g., between a particular emitter and detector). The detectors 316, 318, 320 in optical communication with the first emitter 310 may output a first readout signal, where the first readout signal may correspond to the first emitter 310. For example, if the first sensor pair and the second sensor pair do not detect the obstruction, but the third sensor pair does detect the obstruction, then the object threshold for the third sensor pair may be adjusted while the object threshold for the first sensor pair and the second sensor pair remains unaltered. By determining which emitter is emitting the electromagnetic radiation, the recalibration may be specific to a sensor pair, thus increasing the accuracy of detection of objects, even in the presence of the obstruction. The first emitter 310 may be a first emitter distance from the second emitter 312. The first emitter distance may be between about 0.5 inches to about 2.5 inches. The first detector 316 may be a first detector distance from the second detector 318. The first detector distance may be between about 0.5 inches to about 2.5 inches.

The second emitter 312 may interact with the detector array 306, as illustrated in FIG. 3B. The second emitter 312 may be emitting electromagnetic radiation. The electromagnetic radiation may be detected by the first detector 316, the second detector 318, and/or the third detector 320. The second emitter 312 and the first detector 316 may comprise a fourth sensor pair, the second emitter 312 and the second detector 318 may comprise a fifth sensor pair, and the second emitter 312 and the third detector 320 may comprise a sixth sensor pair. The detectors 316, 318, 320, in optical communication with the second emitter 312, may output a second readout signal, where the second readout signal is different from the first readout signal. For example, if a second obstruction is detected by the fourth sensor pair, the fifth sensor pair, and the sixth sensor pair, then the object threshold for the fourth sensor pair, the fifth sensor pair, and the sixth sensor pair may be adjusted. The second emitter 312 may be a second emitter distance from the third emitter 314. The second emitter distance may be between about 0.5 inches to about 2.5 inches. The second detector 318 may be a second detector distance from the third detector 320. The second detector distance may be between about 0.5 inches to about 2.5 inches.

The third emitter 314 may interact with the detector array 306, as illustrated in FIG. 3C. The third emitter 314 may be emitting electromagnetic radiation. The electromagnetic radiation may be detected by the first detector 316, the second detector 318, and/or the third detector 320. The third emitter 314 and the first detector 316 may comprise a seventh sensor pair, the third emitter 314 and the second detector 318 may comprise an eighth sensor pair, and the third emitter 314 and the third detector 320 may comprise a ninth sensor pair. The detectors 316, 318, 320, in optical communication with the third emitter 314, may output a third readout signal. The third readout signal may be different than the first readout signal and the second readout signal. For example, if no obstruction is detected by the seventh sensor pair, the eighth sensor pair, or the ninth sensor pair, then the object threshold may not be adjusted.

The third emitter 314 may be a third emitter distance from the first emitter 310. The third emitter distance may be between about 0.5 inches to about 2.5 inches. It may be appreciated that the emitter array 304 may have any of a plurality of configurations. For example, at least some of the emitters 310, 312, 314 and/or other emitters may be disposed in a linear configuration (e.g., coaxial in a single plane, etc.) and/or disposed in a staggered configuration (e.g., not coaxial and/or in one or more different planes).

The third detector 320 may be a third detector distance from the first detector 316. The third detector distance may be between about 0.5 inches to about 2.5 inches. It may be appreciated that the detector array 306 may have any of a plurality of configurations. For example, at least some of the detectors 316, 318, 320 and/or other detectors may be disposed in a linear configuration (e.g., coaxial in a single plane, etc.) and/or disposed in a staggered configuration (e.g., not coaxial and/or in one or more different planes).

Having nine sensor pairs allows for increased detection. For example, if the first emitter 310 was blocked by an opaque obstruction, then the first sensor pair, the second pair, and third sensor pair may not function. However, the fourth sensor pair, the fifth sensor pair, the sixth sensor pair, the seventh sensor pair, the eighth sensor pair, and the ninth sensor pair would function, even in the presence of a non-opaque obstruction. Although, the emitter array 304 is illustrated with three emitters, one or more additional emitters are contemplated. Although, the detector array 306 is illustrated with three detectors, one or more additional detectors are contemplated.

Figure 4:
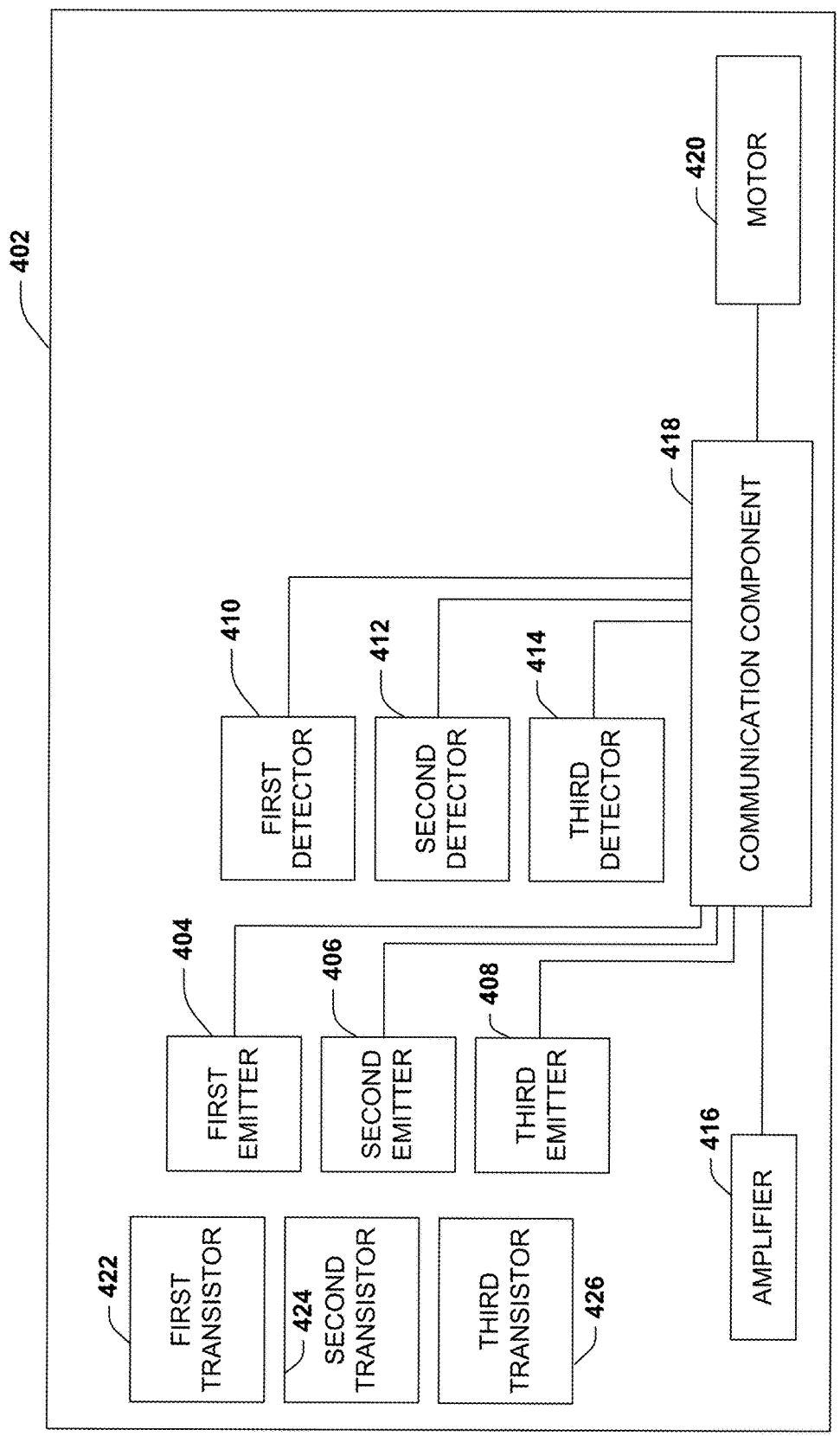
FIG. 4 is a schematic illustration of an example dispensing device, according to some embodiments.
Figure 7:
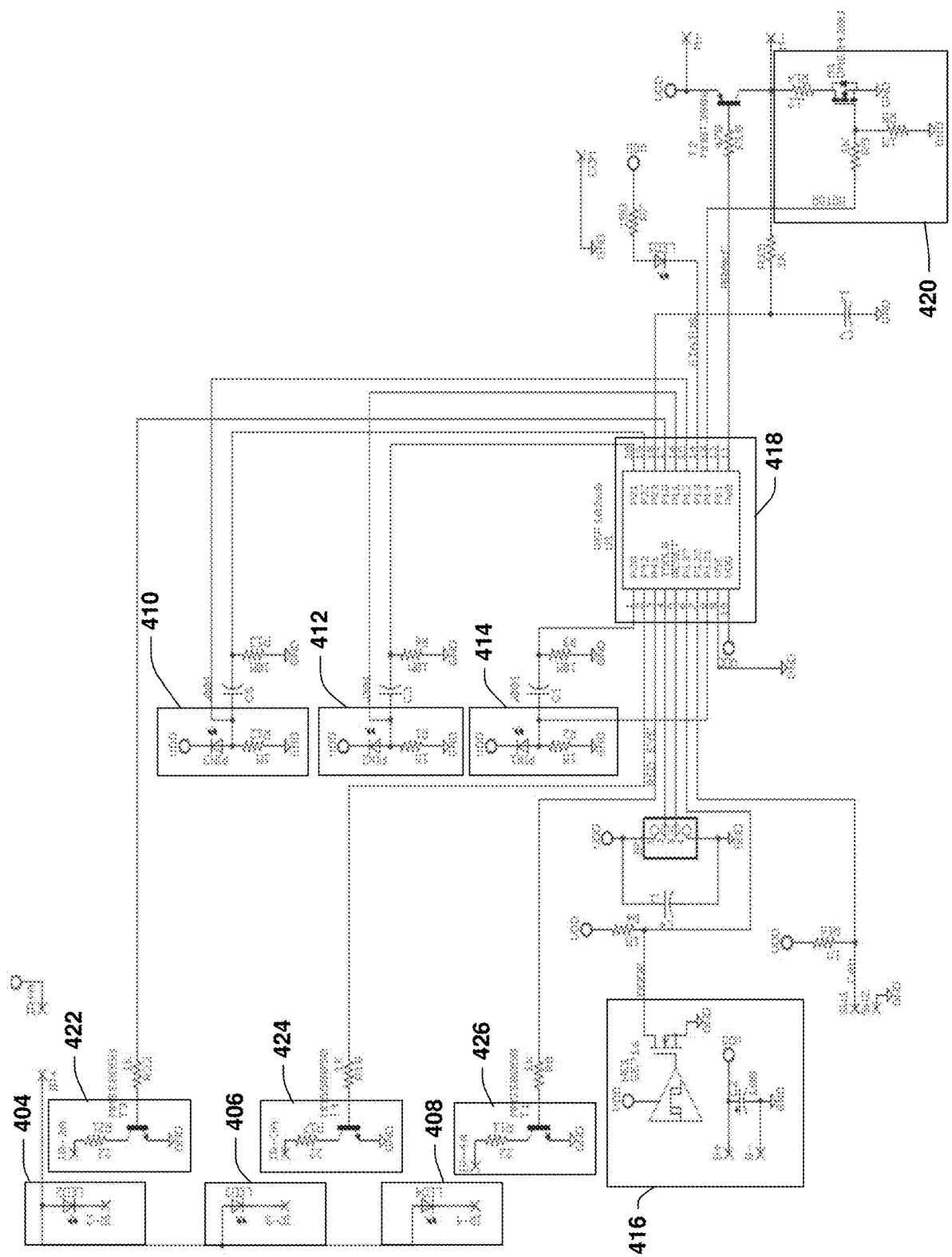
FIG. 7 is an illustration of a circuit schematic of an example dispensing device, according to some embodiments.

FIG. 4 illustrates a schematic of a dispensing device 402, and FIG. 7 is an illustration of a circuit schematic of an example dispensing device, such as the dispensing device 402. The dispensing device 402 may comprise a first emitter 404 (e.g., a diode LED2 connected to IR-2 and/or IR+ connections), a second emitter 406 (e.g., a diode LED3 connected to IR-3 and/or IR+ connections), and a third emitter 408 (e.g., a diode LED4 connected to IR-4 and/or IR+ connections) in communication with a communication component 418. The first emitter 404, the second emitter 406, and/or the third emitter 408 may emit, for example, electromagnetic radiation (e.g., a visible light signal, an ultra violet (UV) signal, and/or an infrared (IR) signal). The communication component 418 may comprise a circuit (e.g., a microcontroller), such as a programmable circuit and/or a circuit comprising logic. As will be appreciated, the communication component 418 (e.g., microcontroller) serves to drive one or more emitters, read one or more detectors, and make logic decisions.

The first emitter 404 may be driven or otherwise activated by a first transistor 422 (e.g., the first transistor 422 (e.g., a gate of the first transistor 422) connected to a port (e.g., 17) of the communication component 418 (e.g., through a (e.g., 1 kilo ohm) resistor R22)). In an example, a first source/drain region of the first transistor 422 is coupled to a resistor R21. In an example, a second source/drain region of the first transistor 422 is coupled to a voltage source, such as ground. The first transistor 422 may act as an on/off switch for the first emitter 404. The second emitter 406 may be driven or otherwise activated by a second transistor 424 (e.g., the second transistor 424 (e.g., a gate of the second transistor 424) connected to a port (e.g., 2) of the communication component 418 (e.g., through a (e.g., 1 kilo ohm) resistor R18)). In an example, a first source/drain region of the second transistor 424 is coupled to a resistor R17. In an example, a second source/drain region of the second transistor 424 is coupled to a voltage source, such as ground. The second transistor 424 may act as an on/off switch for the second emitter 406. The third emitter 408 may be driven or otherwise activated by a third transistor 426 (e.g., the third transistor 426 (e.g., a gate of the third transistor 426) connected to a port (e.g., 3) of the communication component 418 (e.g., through a (e.g., 1 kilo ohm) resistor R8)). In an example, a first source/drain region of the third transistor 426 is coupled to a resistor R11. In an example, a second source/drain region of the third transistor 426 is coupled to a voltage source, such as ground. The third transistor 426 may act as an on/off switch for the third emitter 408.

The dispensing device 402 may comprise a first detector 410 in optical communication with the first emitter 404, the second emitter 406, and the third emitter 408. In an example, the first detector 410 may comprise a photodiode PIN3. In an example, the photodiode PIN3 is connected to a voltage source, such as a supply voltage VDD. In an example, the photodiode PIN3 is connected to a resistor R12. In an example, the resistor R12 is connected to a voltage source, such as ground. The dispensing device 402 may comprise a second detector 412 in optical communication with the first emitter 404, the second emitter 406, and the third emitter 408. In an example, the second detector 412 may comprise a photodiode PIN2. In an example, the photodiode PIN2 is connected to a voltage source, such as a supply voltage VDD. In an example, the photodiode PIN2 is connected to a resistor R. In an example, the resistor R1 is connected to a voltage source, such as ground. The dispensing device 402 may comprise a third detector 414 in optical communication with the first emitter 404, the second emitter 406, and the third emitter 408. In an example, the third detector 414 may comprise a photodiode PIN1. In an example, the photodiode PIN1 is connected to a voltage source, such as a supply voltage VDD. In an example, the photodiode PIN1 is connected to a resistor R2. In an example, the resistor R12 is connected to a voltage source, such as ground. The detectors (e.g., the first detector 410, the second detector 412, and the third detector 414) may be configured to detect electromagnetic radiation (e.g., infrared) emitted from at least one of the first emitter 404, the second emitter 406, or the third emitter 408.

The detectors 410, 412, 414 may be in communication with the communication component 418. In an example, at least one of the first detector 410, the second detector 412, or the third detector 414 is connected through an AC connection for AC coupling to the communication component 418 and a DC connection for DC coupling to the communication component 418. In an example, the first detector 410 is DC coupled to port 15 and AC coupled to port 19. In an example, the first detector 410 is connected to port 19 through at least one of a capacitor C5 or a resistor R13. In an example, the resistor R13 is connected to a voltage source, such as ground. In an example, the second detector 412 is DC coupled to port 16 and AC coupled to port 20. In an example, the second detector 412 is connected to port 20 through at least one of a capacitor C3 or a resistor R6. In an example, the resistor R6 is connected to a voltage source, such as ground. In an example, the third detector 414 is AC coupled to port 1 and DC coupled to port 8. In an example, the third detector 414 is connected to port 1 through at least one of a capacitor C1 or a resistor R3. In an example, the resistor R3 is connected to a voltage source, such as ground.

While in an idle state, one or more detectors are read over an AC connection, such as through capacitors C1, C3, and/or C5, by the communication component 418. If a target is detected due to an absence of a detector seeing an emitter through an AC connection, an additional read is made through a DC connection to determine if the absence of signal is an actual target or due to blinding of a photodiode of the detector from ambient light. If the photodiode is blinded, then the target detection is ignored. A motor 420, for dispensing a material (e.g., a sanitizing substance), may be in communication with the communication component 418. The motor 420 may be activated responsive to an object being detected between at least one of the emitters 404, 406, 408 and at least one of the detectors 410, 412, 414. In an example, the motor 420 comprises a first resistor R1, a second resistor R5, a third resistor R14, and a diode M1 (e.g., as one or more drive components for the motor). In an example, the first resistor R1 is coupled to port 13 of the communication component 418 and to the second resistor R5 and the diode M1. In an example, the second resistor R5 is connected to a voltage source, such as ground. In an example, the diode M1 is connected to the third resistor R14 and to a voltage source, such as ground. In an example, the third resistor R14 is connected to a first source/drain region of a transistor T2 and to port 18 of the communication component 418 through a resistor R15. In an example, a gate of the transistor T2 is connected to port 11 of the communication component 418 through a resistor R10. In an example, a second source/drain region of the transistor T2 is connected to a voltage source, such as a supply voltage VDD. In an example, the resistor R15 is connected a capacitor C7. In an example, the capacitor C7 is connected to a voltage source, such as ground. In an example, a voltage source, such as a supply voltage VDD is connected to port 14 of the communication component 418. In an example, the voltage source is connected to port 14 of the communication component 418 through at least one of a resistor R7 or a diode LED1. A hall effect device 416 is used to detect a magnet in a door switch of the dispensing device 402. In an example, the hall effect device 416 is connected to port 6 of the communication component 418. In an example, the hall effect device 416 comprises an amplifier, a transistor, and a capacitor C2. In an example, the amplifier is connected to a voltage source, such as a supply voltage VDD. In an example, an output of the amplifier is connected to a gate of the transistor. In an example, a first source/drain region of the transistor is connected to a resistor R4. In an example, a second source/drain region of the transistor is connected to a voltage source, such as ground. In an example, the capacitor C2 is connected between a first voltage source, such as a supply voltage VDD, and a second voltage source, such as ground. In an example, the resistor R4 is connected to a voltage source, such as a supply voltage VDD and to port 6 of the communication component 418. In an example, a resistor R16 is connected to a voltage source, such as a supply voltage VDD and to port 7 of the communication component 418. In an example, a capacitor C4 is connected between a first voltage source, such as a supply voltage VDD, and a second voltage source, such as ground. In an example, the first voltage source is connected to a first pin of a device and the second voltage source is connected to a second pin of the device, where a second pin of the device is connected to port 4 of the communication component 418 and a third pin of the device is connected to port 5 of the communication component 418.

Figure 5:
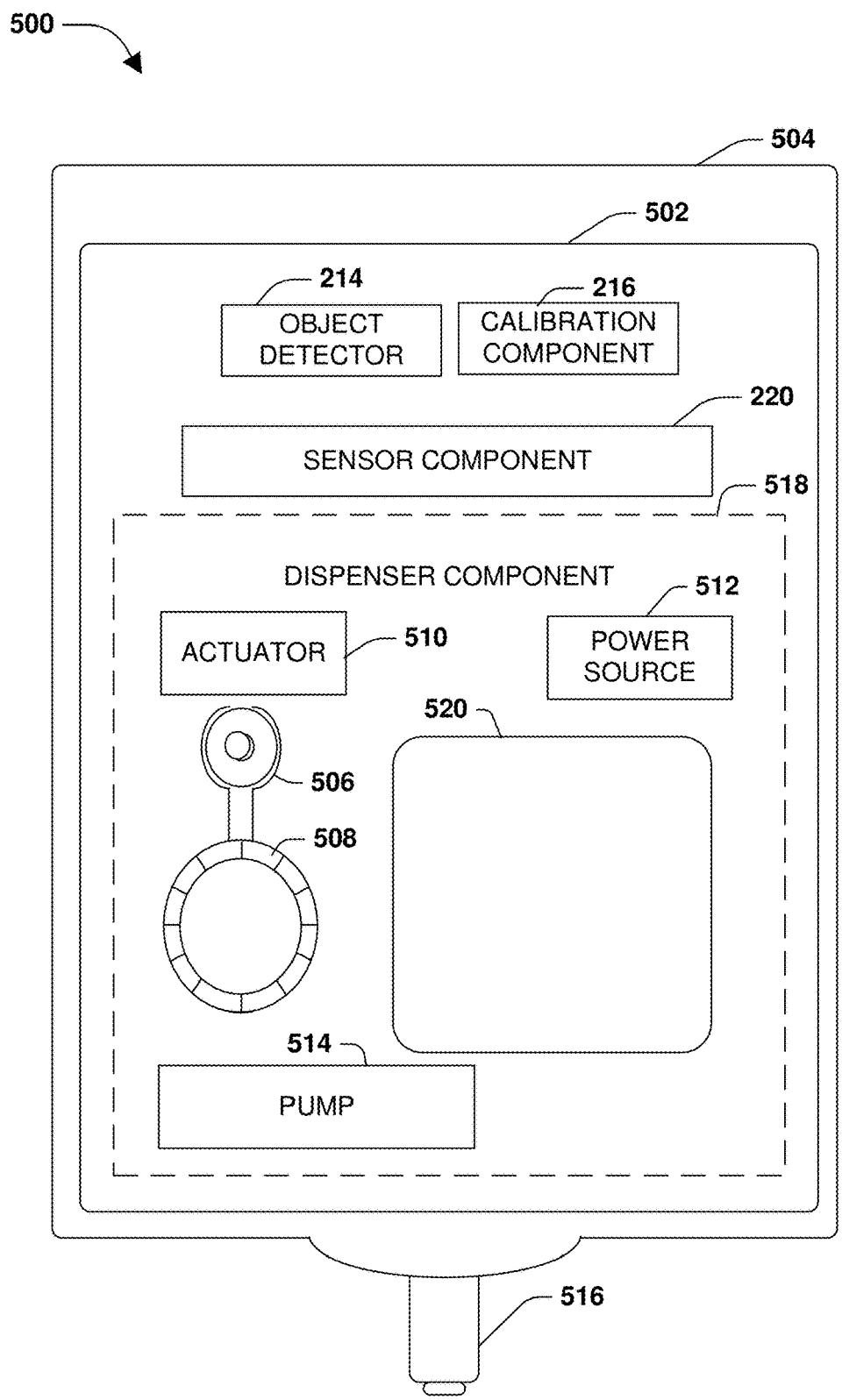
FIG. 5 is an illustration of an example dispensing device, according to some embodiments.

FIG. 5 illustrates an example of a dispensing system 500, comprising a dispenser 504. The dispenser 504 may comprise a housing 502 configured to hold a refill container 520 comprising a material (e.g., a liquid material, a powder material, an aerosol material, an antibacterial product, medicine, etc.). The housing 502 may comprise various mechanical and/or electrical components that facilitate operation of the dispenser 504, such as one or more components that dispense material from the refill container 520. In an example, the dispenser 504 may comprise the object detector 214, the calibration component 216, and/or the sensor component 220, as illustrated above in FIGS. 2A-2E. In an example, the housing 502 may comprise a dispenser component 518. The dispenser component 518 may comprise an actuator 510, a power source 512, a motor 506, a drivetrain 508 (e.g., a gear train), the refill container 520, and/or other components (e.g., a pump 514 and/or a dispenser nozzle 516 associated with the refill container 520). The power source 512 (e.g., a battery, an AC adapter, power from a powered network communication line, etc.) may provide power to the actuator 510, the motor 506, and/or other components. The actuator 510 may be configured to detect a dispense request (e.g., a hand of a user may interact with the sensor component 220). The actuator 510 may be configured to invoke the motor 506 to operate the drivetrain 508 so that the pump 514 dispenses material from the refill container 520 through the dispenser nozzle 516.

Figure 6:
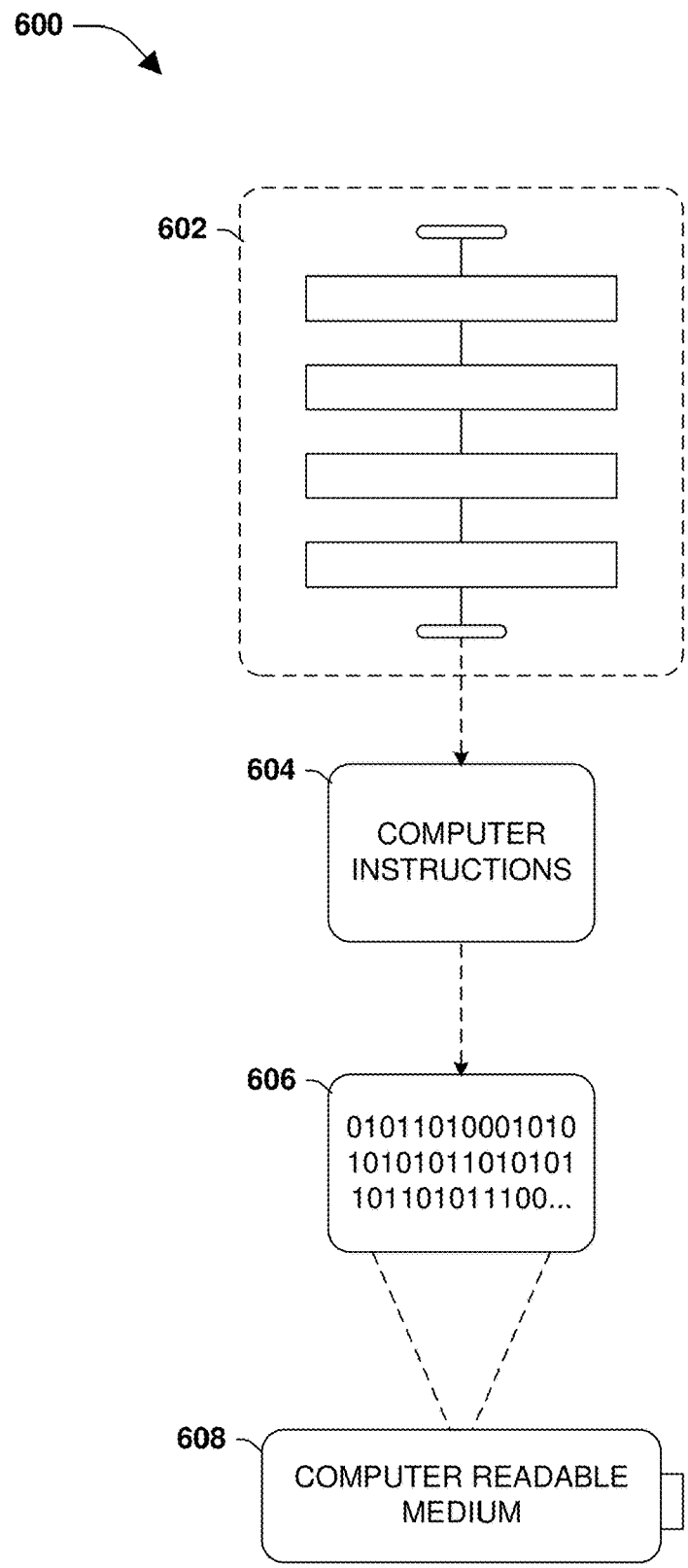
FIG. 6 is an illustration of an example computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1, for example. In some embodiments, the processor-executable instructions 604 are configured to implement a system, such as at least some of the exemplary dispensing device 202 of FIGS. 2A-2E, at least some of the exemplary sensing device 302 of FIGS. 3A-3C and/or at least some of the exemplary dispensing device 402 of FIG. 4, for example. Many such computer-readable media are devised by those of ordinary skill in the art that are configured to operate in accordance with the techniques presented herein.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising". Also, coupled and connected are intended to be synonyms as used herein.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A dispensing device, comprising:
 a sensor component comprising:
  a first emitter in optical communication with a detector array for sensing objects disposed between the first emitter and the detector array, wherein a readout signal is generated by the detector array based upon the optical communication between the first emitter and the detector array;
an object detector configured to identify a presence of an object between the first emitter and the detector array when a pulse in the readout signal has an electrical property over an object threshold; and
a calibration component configured to:
determine that the electrical property of the pulse is over the object threshold for a defined timespan; and
recalibrate the object detector responsive to the determination that the electrical property of the pulse is over the object threshold for the defined timespan to generate an updated object threshold, wherein a value selected for the updated object threshold is determined based upon a value of the electrical property of the pulse as measured during the defined timespan.

2. The dispensing device of claim 1, the calibration component configured to determine the object threshold during an air calibration, the object threshold set as a function of electromagnetic radiation emitted by the first emitter and ambient electromagnetic radiation.

3. The dispensing device of claim 1, comprising:
a first lens disposed over the first emitter; and
a second lens disposed over the detector array.

4. The dispensing device of claim 3, the first lens configured to inhibit soil from contacting the first emitter and the second lens configured to inhibit soil from contacting the detector array.

5. The dispensing device of claim 1, the detector array comprising a first detector and a second detector, the first emitter in optical communication with the first detector and the second detector.

6. The dispensing device of claim 1, comprising:
a second emitter in optical communication with the detector array for sensing objects disposed between the second emitter and the detector array, wherein a second readout signal is generated by the detector array based upon the optical communication between the second emitter and the detector array; and
a third emitter in optical communication with the detector array for sensing objects disposed between the third emitter and the detector array, wherein a third readout signal is generated by the detector array based upon the optical communication between the third emitter and the detector array.

7. The dispensing device of claim 6, wherein:
the first emitter emits electromagnetic radiation during a first interval of time;
the second emitter emits electromagnetic radiation during a second interval of time not overlapping the first interval of time; and
the third emitter emits electromagnetic radiation during a third interval of time not overlapping the first interval of time and not overlapping the second interval of time.

8. The dispensing device of claim 1, comprising:
a dispenser component configured to dispense a material responsive to the electrical property of the pulse being over the object threshold for less than the defined timespan.

9. The dispensing device of claim 1, the optical communication comprising at least one of an infrared (IR) signal, an ultra violet (UV) signal, or a visible light signal.

10. A dispensing device, comprising:
a sensor component comprising:
a first emitter in optical communication with a detector array for sensing objects disposed between the first emitter and the detector array, wherein a readout signal is generated by the detector array based upon the optical communication between the first emitter and the detector array;
an object detector configured to identify a presence of an object between the first emitter and the detector array when a pulse in the readout signal has an electrical property over an object threshold; and
a calibration component configured to:
recalibrate the object detector by altering the object threshold when the electrical property of the pulse is over the object threshold to generate an updated object threshold, wherein recalibrating the object detector comprises:
emitting electromagnetic radiation for a specified period of time;
detecting the electromagnetic radiation to generate a second readout signal,
determining an average value of the second readout signal during the specified period of time; and
setting a value of the updated object threshold based upon the average value.

11. The dispensing device of claim 10, wherein the electromagnetic radiation is emitted by the first emitter.

12. The dispensing device of claim 10, comprising:
a lens disposed over the first emitter.

13. The dispensing device of claim 12, the lens configured to inhibit soil from contacting the first emitter.

14. A dispensing device, comprising:
a sensor component comprising:
a first emitter in optical communication with a detector array for sensing objects, wherein a readout signal is generated by the detector array based upon the optical communication between the first emitter and the detector array;
an object detector configured to identify a presence of an object when a pulse in the readout signal has an electrical property over an object threshold; and
a calibration component configured to:
determine that the electrical property of the pulse is over the object threshold for a defined timespan; and
recalibrate the object detector responsive to the determination that the electrical property of the pulse is over the object threshold for the defined timespan to generate an updated object threshold, wherein a value selected for the updated object threshold is determined as function of the electrical property of the pulse as measured during the defined timespan.

15. The dispensing device of claim 14, comprising:
a second emitter in optical communication with the detector array for sensing objects disposed between the second emitter and the detector array, wherein a second readout signal is generated by the detector array based upon the optical communication between the second emitter and the detector array; and
a third emitter in optical communication with the detector array for sensing objects disposed between the third emitter and the detector array, wherein a third readout signal is generated by the detector array based upon the optical communication between the third emitter and the detector array.

16. The dispensing device of claim 15, wherein:
the first emitter emits electromagnetic radiation during a first interval of time;

the second emitter emits electromagnetic radiation during a second interval of time not overlapping the first interval of time; and the third emitter emits electromagnetic radiation during a third interval of time not overlapping the first interval of time and not overlapping the second interval of time.

17. The dispensing device of claim 15, comprising:

a dispenser component configured to dispense a material responsive to the electrical property of the pulse being over the object threshold for less than the defined timespan.

18. The dispensing device of claim 1, comprising an indicator configured to issue an alert when the calibration component determines that the electrical property of the pulse is over the object threshold for the defined timespan.

19. The dispensing device of claim 1, wherein:

the dispensing device defines a sensing area for receiving the objects, and the first emitter and the detector array are on diametrically opposite sides of the sensing area.

20. The dispensing device of claim 1, wherein the object detector is configured to:

perform a first read over an alternating current (AC) connection with the detector array; and upon detecting the object through the AC connection during the first read, confirm the presence of the object by performing a second read over a direct current (DC) connection with the detector array.

\* \* \* \* \*